United States Patent [19]

Myers

[11] Patent Number: 5,445,714
[45] Date of Patent: Aug. 29, 1995

[54] WASTE MATERIALS CONCENTRATOR

[75] Inventor: Henry S. Myers, Irvine, Calif.

[73] Assignee: Eco Stills, Inc., Costa Mesa, Calif.

[21] Appl. No.: 719,328

[22] Filed: Jun. 20, 1991

Related U.S. Application Data

[63] Continuation-in-part of Ser. No. 648,908, Jan. 31, 1991, abandoned, which is a continuation-in-part of Ser. No. 544,587, Jun. 27, 1990, abandoned.

[51] Int. Cl.$^6$ ............................ B01D 3/00; C02F 1/04
[52] U.S. Cl. .................................... 202/176; 202/186; 203/22; 203/87; 203/98; 203/100; 203/DIG. 8; 159/47.3; 159/DIG. 26; 159/901
[58] Field of Search ............... 203/22, 87, 86, DIG. 8, 203/98, 100; 202/176, 186, 235, 267.1; 34/1 P; 219/10.57; 159/47.3, 24.1, DIG. 26, 901

[56] References Cited

U.S. PATENT DOCUMENTS

| | | | |
|---|---|---|---|
| 992,814 | 5/1911 | Shuman | 202/186 |
| 2,194,056 | 3/1940 | Quaglia | 75/713 |
| 3,017,289 | 1/1962 | Miller | 430/538 |
| 3,229,384 | 1/1966 | Goulston | 202/238 |
| 3,389,059 | 6/1968 | Goeldner | 203/1 |
| 3,410,339 | 11/1968 | Wiegandt | 202/186 |
| 3,457,143 | 7/1969 | Kunst | 203/11 |
| 3,480,513 | 11/1969 | Martin | 202/185.2 |
| 3,493,472 | 2/1970 | Schumacher | 137/15.1 |
| 3,496,071 | 2/1970 | Spence | 202/186 |
| 3,969,194 | 7/1976 | Mende | 202/158 |
| 3,995,298 | 11/1976 | Vandeputte et al. | 354/324 |
| 4,052,267 | 10/1977 | McFee | 202/185.3 |
| 4,140,212 | 2/1979 | O'Blasny et al. | 202/205 |
| 4,141,696 | 2/1979 | Marion et al. | 202/158 |
| 4,235,677 | 11/1980 | Karamian | 202/176 |
| 4,310,387 | 1/1982 | Sadhukhan | 202/185.2 |
| 4,313,786 | 2/1982 | Smith | 159/22 |
| 4,339,307 | 7/1982 | Ellis, Jr. | 202/176 |
| 4,457,805 | 7/1984 | Pastor | 202/83 |
| 4,569,727 | 2/1986 | McCord | 202/186 |
| 4,589,956 | 5/1986 | Westby | 202/186 |
| 4,740,244 | 4/1988 | Williams | 75/713 |
| 4,826,575 | 5/1989 | Karamian | 202/186 |
| 4,865,014 | 9/1989 | Nelson | 126/361 |
| 4,940,134 | 7/1990 | Aoki et al. | 159/47.3 |
| 4,959,122 | 9/1990 | Kurematsu et al. | 159/47.3 |
| 4,976,824 | 12/1990 | Lee | 202/186 |
| 4,985,118 | 1/1991 | Kurematsu et al. | 203/DIG. 18 |
| 5,004,522 | 4/1991 | Koboshi et al. | 159/47.3 |
| 5,034,103 | 7/1991 | Hamer et al. | 202/197 |
| 5,122,633 | 6/1992 | Moshammer et al. | 219/10.55 R |

OTHER PUBLICATIONS

"Disposal and Treatment of Photographic Effluent—In Support of Clean Water", Eastman Kodak Company, 1989.

*Primary Examiner*—Virginia Manoharan
*Attorney, Agent, or Firm*—Richard L. Myers

[57] ABSTRACT

A concentrator for reducing the volume of a mixture containing a solvent and various dissolved and/or undissolved solids includes a chamber adapted to receive the mixture and a heater coupled to the chamber for applying heat to the mixture within the chamber, the heat being provided at a temperature sufficient to vaporize the solvent. A condensing tower receives the vapors from the chamber and including a first stage and at least one second stage. A plurality of walls included in each of the first stage and the second stage of the tower direct the vapors along a torturous path including at least one reversal of direction in each of the stages. A coolant is provided to cool the second stage of the tower but not the first stage in order to facilitate condensation of the vapors in the second stage but not in the first stage of the tower. The coolant may include water in order to facilitate the processing of aqueous solutions.

22 Claims, 8 Drawing Sheets

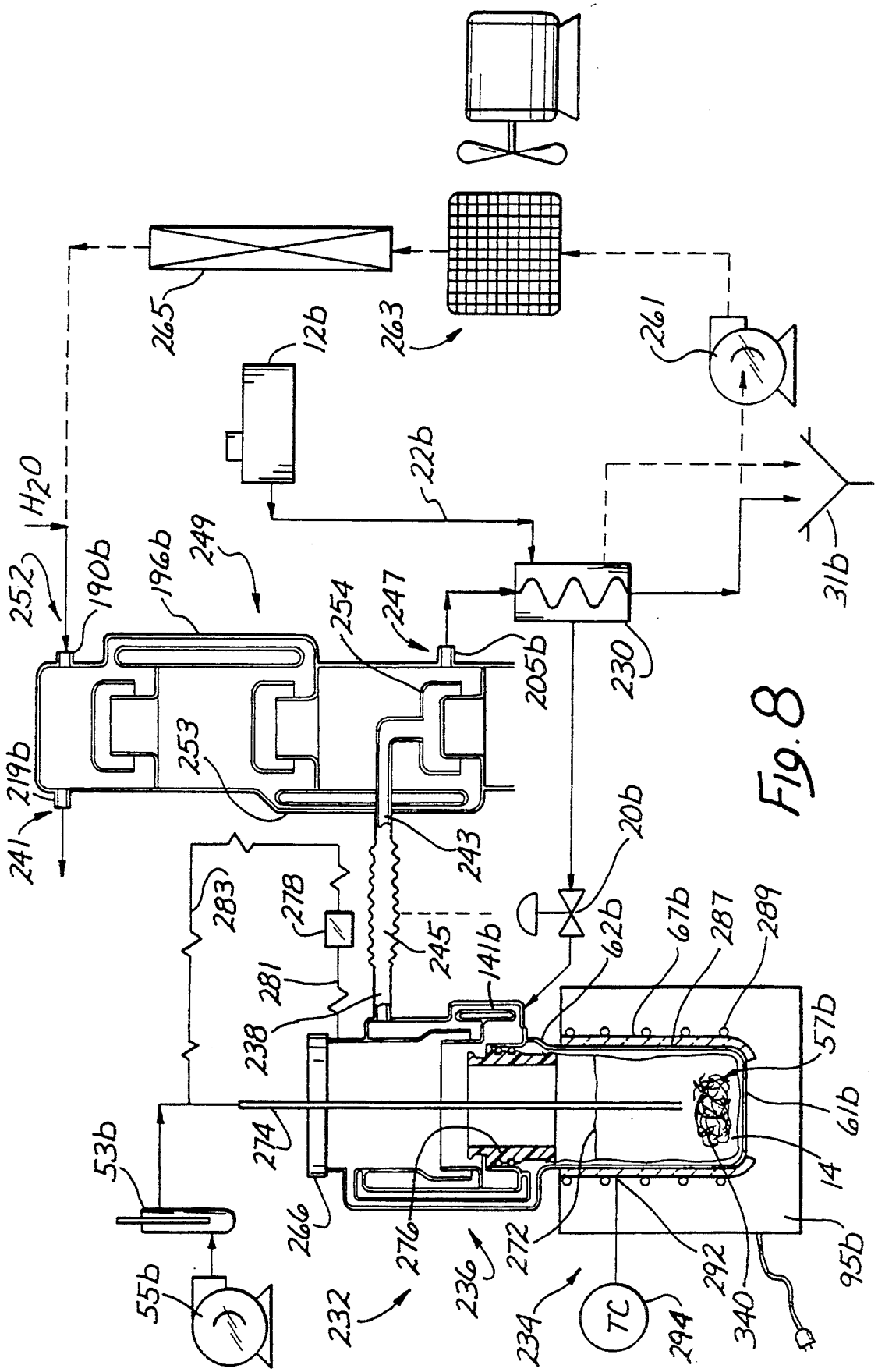

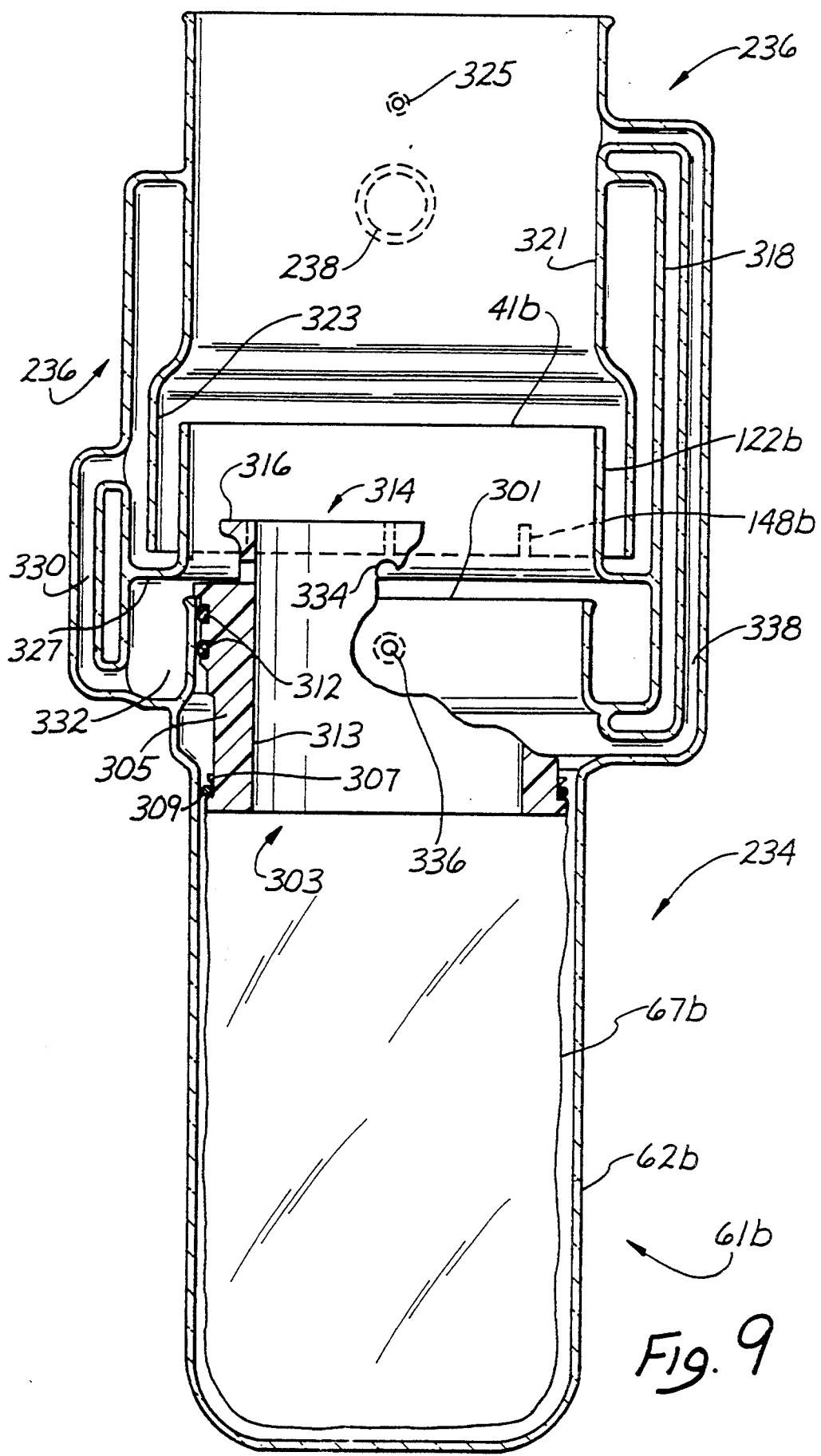

WASTE MATERIALS CONCENTRATOR

CROSS REFERENCE TO RELATED APPLICATION

This is a continuation-in-part of Applicant's U.S. patent application Ser. No. 07/648,908 filed on Jan. 31, 1991, now abandoned which is a continuation-in-part of U.S. patent application Ser. No. 07/544,587 filed on Jun. 27, 1990, now abandoned.

BACKGROUND OF THE INVENTION

1. Field of the Invention

This invention relates generally to apparatus and methods for concentrating waste materials and more specifically to concentrators particularly adapted for the volumetric reduction of waste solutions such as the effluent from photoprocessing laboratories.

2. Discussion of the Prior Art

Increasing concern over pollution of the environment has created an escalating demand for apparatus and methods which will eliminate or at least minimize the discharge of waste materials into the environment. In recent years, the focus has been primarily on large-scale operations, such as refineries or chemical plants, which have been carefully monitored and forced to develop zero discharge processes. More recently, the focus has begun to shift to small scale polluters such as those associated with photoprocessing laboratories (including mini-labs), x-ray laboratories (primarily in hospitals and doctor's offices), printing and engraving shops, and biological laboratories. Acid solutions associated with circuit board etching and metal plating have also been of concern along with the solvents and cutting fluids associated with machine shops, garages and paint shops.

All of these solutions are harmful if not toxic and therefore are potentially damaging to the atmosphere. Even though these are typically small scale operations, the number of such operations is large so that the overall volume of waste is significant.

Liquid wastes are far more difficult and expensive to process for disposal than are solid wastes. For this reason, the purpose of most recovery devices associated with liquid waste is either to reclaim the liquid solvent, leaving only the solid residue, or to concentrate the solution so as to reduce the quantity of the contaminated waste. In the case of aqueous wastes, the solvent (water) need not be recycled to the process but may be discharged to a drain if it is sufficiently pure.

SUMMARY OF THE INVENTION

In accordance with the present invention, apparatus and methods are disclosed which can process various liquid wastes to at least reduce the volume of waste material. The apparatus is particularly suited to the treatment of aqueous waste although non-aqueous solvents may also be processed. Most specifically, the apparatus is adapted for the processing of effluent from photoprocessors and photodevelopers of the type used for rapid, 1-hour processing. These mini-labs typically generate from two to five gallons of aqueous discharge each day depending upon the amount of film processed. The discharge typically includes silver, which may or may not be removed by other means, in addition to a multitude of inorganic or organic chemicals, various dyes, as well as ammonia.

In accordance with the present invention, the liquid waste to be processed is fed into a glass vessel where it is boiled either by exposure to microwave radiation or electrical heat energy, for example a quartz heater. As the liquid is boiled, it can be treated with freshly-generated ozone in order to promote decomposition of objectionable compounds such as, in the case of photochemical applications, high molecular weight alcohols and ammonia. A second purpose of the ozone is to reduce any foaming action which may result from the boiling. Photochemicals in particular have a propensity to foam when boiled; the ozone tends to inhibit that foaming action.

Vapors arising from the boiling liquid are introduced to a condensing tower which typically includes multiple condensing stages. Vapor flow reversals in these stages tend to direct the vapor onto the glass surfaces of the vessel. In some of these stages, a coolant can be introduced to the tower to promote condensation of the vapor. However in an initial stage, the surfaces directing vapor flow may be insulated from the coolant in order to inhibit condensation so that only solid material and tiny entrained liquid droplets are returned to the boiler. In these ultimate stages, the rising vapor is bubbled through a descending coolant to produce a fractionation stage or plate. If the waste being processed includes an aqueous solvent, the ascending vapor may be scrubbed by the water coolant and the combination discharged to a drain. Vapor leaving the top condenser stage can be introduced directly to the atmosphere, or may be discharged through a charcoal absorber in order to capture any odor-producing contaminates, such as ammonia.

In one embodiment of the boiler, microwave radiation is used for heating the waste material; it also may advantageously promote decomposition of some undesirable waste contaminates, such as pesticides and ammonia. In another embodiment, heat is supplied by a quartz immersion heater which is positioned inside the boiler or thirdly by a thermostatted heating mantle.

In each embodiment, a liner, which may be either disposable or reusable, can be provided in the boiler to facilitate removal of dried solids. The boiler can be conically shaped to facilitate settlement of the residue which can then be withdrawn through an outlet nozzle. This residue can be pumped as a concentrated slurry to a filter where the solids are removed. The filter screen can then be cleaned or replaced as processing continues.

In accordance with one aspect of the invention, an apparatus is provided for reducing the volume of a mixture containing a solid and various organic and/or inorganic compounds. The apparatus includes means forming a chamber adapted to receive the mixture; means coupled to the chamber for applying heat to the mixture, the heat being provided at a temperature sufficient to vaporize the liquid; a condensing tower coupled to receive the vapors from the chamber and including a first stage and at least one second stage; directing means included in each of the stages for receiving the vapors and for directing the vapors along a torturous path including at least one reversal of direction; and means for cooling the second stage of the tower but not the first stage in order to facilitate condensation of the vapors in the second stage but not in the first stage of the tower.

In another aspect of the invention, a method for reducing the volume of a mixture containing a solvent and various organic and/or inorganic compounds, including the steps of providing a chamber adapted to receive the mixture; heating the mixture in the chamber to a temperature sufficient to vaporize a portion of the mixture; separating the mixture into a vapor and a slurry containing a residue of the mixture; directing the vapors in the mixture into a condensing tower having a first stage and a second stage, the vapors having a tendency to condense in each of the first stage and the second stage; inhibiting condensation of the vapors in the first stage; facilitating condensation of the vapors in the second stage; directing any condensate formed in the first toward the chamber; and expelling any condensate formed in the second stage from the condensing tower.

In still a further aspect of the invention, a concentrator includes a container for receiving the mixture up to a particular level in the container, means for vaporizing at least a portion of the solvent in the mixture to form a solvent vapor in the container, the vapor having a first pressure above the particular level, and means responsive to the first pressure of the solvent vapor for maintaining the level of the mixture in the container at about the particular level.

In still a further aspect of the invention the concentrator includes a container for receiving the mixture; means for vaporizing the solvent to create a solvent vapor having a particular temperature; condensing means coupled to the container and receiving a condensing liquid at a first temperature; less than the particular temperature, the condensing liquid condensing the solvent vapor while increasing in temperature to a second temperature greater than the first temperature; and recirculating means for receiving the condensing liquid at the second temperature and for returning the condensing liquid to the condensing means of the first temperature.

In another aspect of the invention, apparatus is provided for reducing the hazardous characteristics of a mixture including a solvent and at least a first metal, the first metal being present in a soluble form and a first concentration. The apparatus includes means forming a chamber adapted to receive the mixture; means coupled to the chamber for applying heat to the mixture in the chamber, the heat being applied at a temperature sufficient to vaporize the solvent; and means added to the mixture in a particular form and including a second metal different from the first metal, for facilitating a change in the concentration of the first metal in soluble form to a second concentration less than the first concentration. If the first metal in the mixture is silver, the second metal may include iron. The particular form of the iron may be a steel wool.

In still a further aspect of the invention, a method for reducing the hazardous characteristics of the mixture includes the step of heating the mixture in the container to a temperature sufficient to vaporize the solvent; and during the heating step, adding to the mixture the second metal in order to reduce the concentration of the first metal in soluble form to a second concentration less than the first concentration.

These and other features and aspects of the present invention will be more apparent with a detailed description of preferred embodiments and reference to the associated drawings.

BRIEF DESCRIPTION OF THE DRAWINGS

FIG. 8 is a schematic diagram illustrating a further embodiment of the invention which provides for preheating of the solution and recirculation of a condensing liquid; and FIG. 9 is an axial cross-section view of a boiler illustrated schematically in FIG. 8.

DESCRIPTION OF PREFERRED EMBODIMENTS

Figure 1:
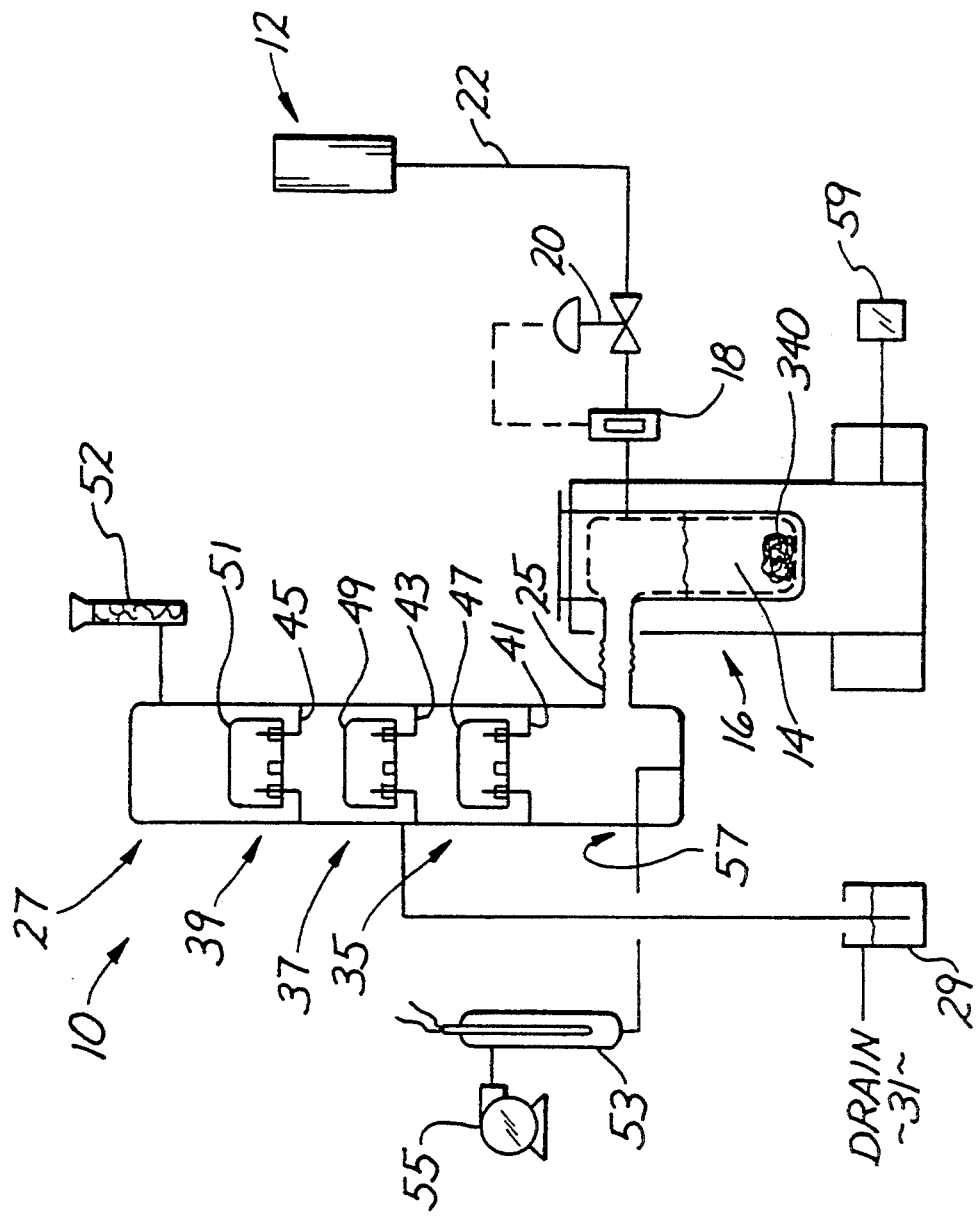
FIG. 1 is a schematic diagram illustrating a solution concentrator including a condensing tower, a heating vessel including steel wool, and an oven.

A system for concentrating liquid waste, subsequently referred to as a concentrator, is shown schematically in FIG. 1 and designated by the reference numeral 10. This concentrator 10 is particularly adapted to reduce the volume of liquid wastes or slurries which include a solvent and various waste materials. Although the concentrator 10 is particularly adapted to accommodate aqueous waste, such as the waste associated with photoprocessing laboratories, with some modifications including the addition of one internal cooling coil, it is equally adaptable to process solvents associated with cutting fluids from machine shops, and thinners from paint shops.

Disposal of liquid wastes of these types is particularly difficult and expensive. While the volume of such liquid waste is of particular concern so is the fact that the liquid solvents can promote chemical reaction over time and risk leakage into the water table. For these reasons it is the purpose of most recovery devices either to reclaim the liquid solvent to concentrate the solution so that smaller quantities of the contaminated liquid remain to be handled. In the case of aqueous waste, the solvent (water) may be sufficiently pure that it can be discharged down a normal sewer drain.

An aqueous waste of particular concern is that associated with the effluent from photographic laboratories such as mini-labs which provide one-hour processing. These labs normally generate about five gallons of aqueous discharge each day depending on the amount of film or prints processed. In addition to the water solvent, this discharge may include silver and various other inorganic and organic compounds as well as various dyes and ammonia.

In FIG. 1 a photoprocessor, designated generally by the reference numeral 12, provides a supply of aqueous effluent or waste 14 which is introduced to a boiler shown generally at 16. The level of waste 14 in the boiler 16 is sensed by a level switch 18 which controls a solenoid valve 20 in a feed line 22 extending between the photoprocessor 12 and boiler 16.

In the boiler 16, the waste 14 is heated to a temperature at least as high as the temperature of vaporization associated with he solvent. In the case of an aqueous effluent, the waste 14 is heated to a temperature of 212° F.

In this embodiment, the boiler 16 consists of an oven which applies microwave energy to raise the temperature of the waste 14 to an appropriate level. At the temperature of vaporization the solvent, such as water, in the waste 14 will vaporize and the vapors will be directed through a generally horizontal discharge tube 25 into a condensing tower or condenser shown generally at 27. In this particular embodiment, it is the purpose of the condenser 27 to condense the aqueous vapor and to discharge the water condensate through a seal port 29 into a drain 31. The seal port may also include a heat exchange coil whereby incoming cold feed is heated by the warm discharge water.

In the illustrated embodiment, the condenser 27 has a generally cylindrical outer shell 33 and three stages 35, 37 and 39 which are axially spaced within the shell 33. Each of the stages 35, 37 and 39 includes a chimney 41, 43, 45 and a bubble cap 47, 49, 51 respectively. As the aqueous vapor passes through the various stages 35, 37 and 39, most of it condenses and the water condensate is discharged to the drain 31. This remaining vapor can be discharged through a charcoal filter 52 and released to the atmosphere.

It has been found to be particularly desirable to introduce ozone gas into the waste 14. In this particular embodiment, the ozone gas is generated by the UV light 53 and a blower 55 which provides a flow of air across the light 53. This creates ozone in the air which is then introduced into the concentrator 27. In this particular embodiment a reservoir shown generally at 57 is provided in the bottom of the condenser 27. This reservoir 57 captures a pool of the liquid condensate into which the ozone can be bubbled.

As discussed in greater detail below, the ozone serves two major purposes. First, it promotes decomposition of objectionable compounds into their elements. This may tend to reduce noxious odors. Second, the introduction of ozone into the mixture tends to prevent foaming which might otherwise inhibit the process.

As operation of the condenser continues, the aqueous solvent in the waste 14 is vaporized, condensed into water, and discharged down the drain 31. After all of the effluent has been processed, and the aqueous solvent has evaporated, what remains in the boiler 16 is primarily a slurry or residue. Further operation of the boiler 16, such as a microwave oven or thermostatted electric resistance element, will heat this residue to dryness. It can then be disposed of in a significantly reduced volume. A temperature control 59 can be provided to discontinue operation of the boiler 16 when the temperature of the residue achieves a predetermined level.

Figure 2:
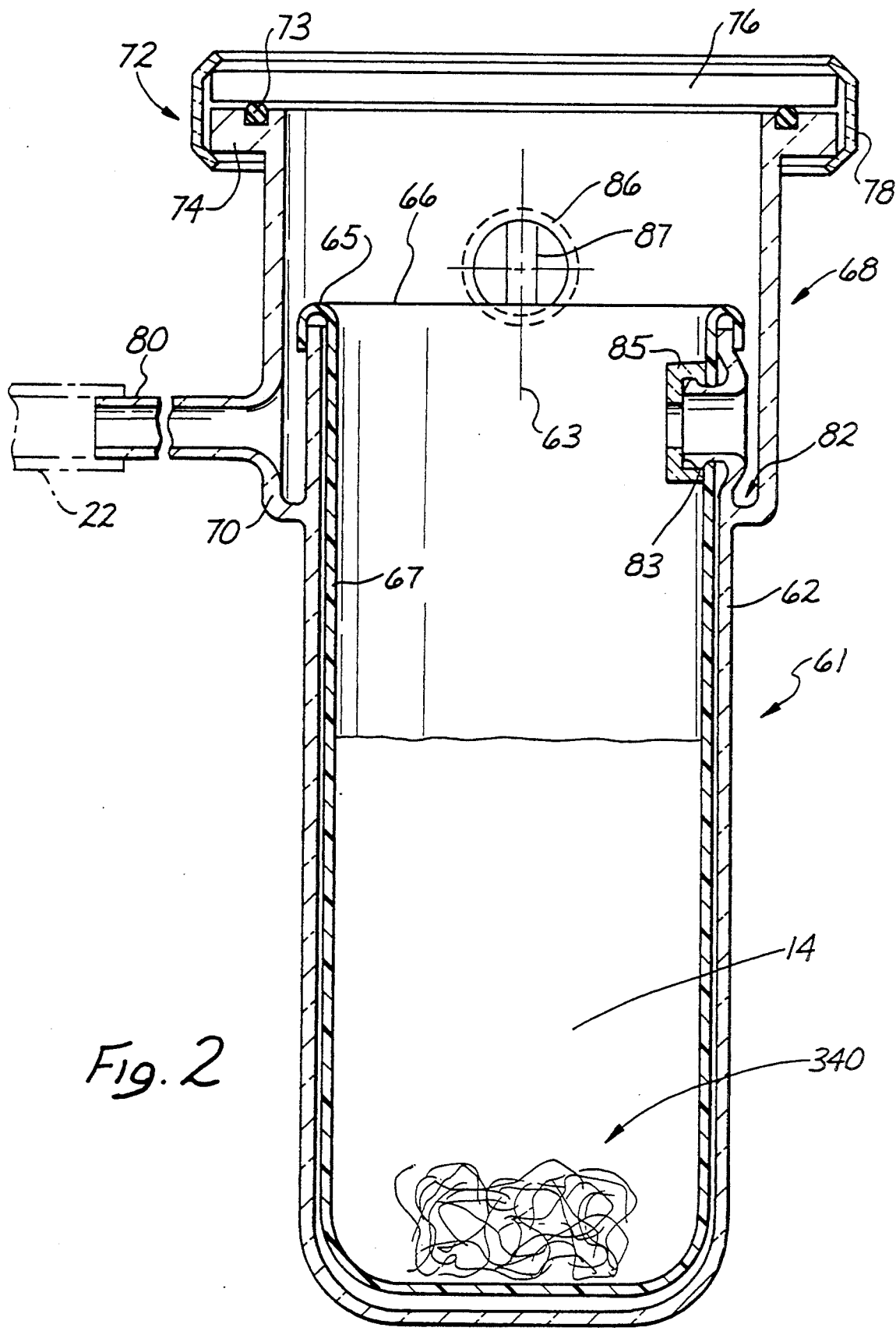
FIG. 2 is an axial cross-section view of a heating vessel, including steel wool, which is particularly adapted for use with the oven of FIG. 1.

The boiler 16 is shown in greater detail in FIG. 2. The boiler 16 is preferably formed from borosilicate or quartz glass, particularly when it is intended for use with a microwave oven. This glass which is unaffected by and transparent to microwave radiation, can withstand the temperatures required by the boiler 16 while at the same time permitting the process to be viewed through the glass and the apparatus to be easily cleaned.

The boiler 16 comprises a receptacle 61 defined in part by a wall 62 which is generally cylindrical in configuration about an axis 63. The receptacle 61 is sealed at the bottom but is provided with a top edge 66 which forms a wide mouth 65 at the top of receptacle 61. The wide mouth 65 provides access to a removable liner 67 which is configured to fit within the receptacle 61.

In one embodiment, the liner 67 is formed of polytetrafloroethelene, although other materials such as a polypropylene may be equally advantageous. In general, the material of the liner 67 must have characteristics for withstanding the temperatures developed by the boiler 16 while permitting easy removal from the receptacle 61 and disposal of the residue. The wall of the liner 67 is closely spaced to the wall 62 of the receptacle 61 and can be bent back on itself to form a cylindrical lip 65 which engages the top edge 66 of the receptacle 61. In another embodiment, the liner is made from a porous or woven mesh filter which permits water and any dissolved solids to flow outward through the liner while retaining any precipitated solids inside. Fiberglass has been found to be well suited for this application.

Associated with the receptacle 61 is a manifold 68 which is formed generally from cylindrical walls 70 that are slightly larger in diameter than the walls 62 of the receptacle 61. The walls 70 extend from a location where they are attached to the walls of the receptacle 61 beneath the top edge 66, to a circular seal 72 which extends above the top edge 66. The seal 72 can be formed by an O-ring 73 which is pressed between a flange 74 on the manifold 68 and a lid 76 using a circular V-clamp 78.

In this embodiment, the effluent or waste 14 is fed into the boiler 16 by the feed line 22 which is attached to an inlet nozzle 80. This nozzle 80 is formed in the wall 70 of the manifold 68 and directs the effluent 14 into an anti-slosh chamber 82 which is formed between the inner surface of the wall 70 and the outer surface of the receptacle 61.

The effluent in the anti-slosh chamber 82 passes through a nozzle 83 which extends through the walls of the receptacle 61 and the wall of the liner 67. The end of the nozzle 83 is positioned inside of the liner 67 so that waste 14 is deposited at the bottom of the liner 67. The innermost end of the nozzle 83 can be threaded to receive a nut 85 which presses the liner 67 against the inner surface of the wall 62. This seal will generally prevent any moisture from collecting between the liner 67 and the wall 62 of, the receptacle 61.

As the solvent in the waste 14 vaporizes, it rises from the receptacle 61 into the manifold 68. A nozzle 86 extending through the wall 70 of the manifold 68 permits the vapor to pass from the boiler 16 into the discharge tube 25.

Figure 3:
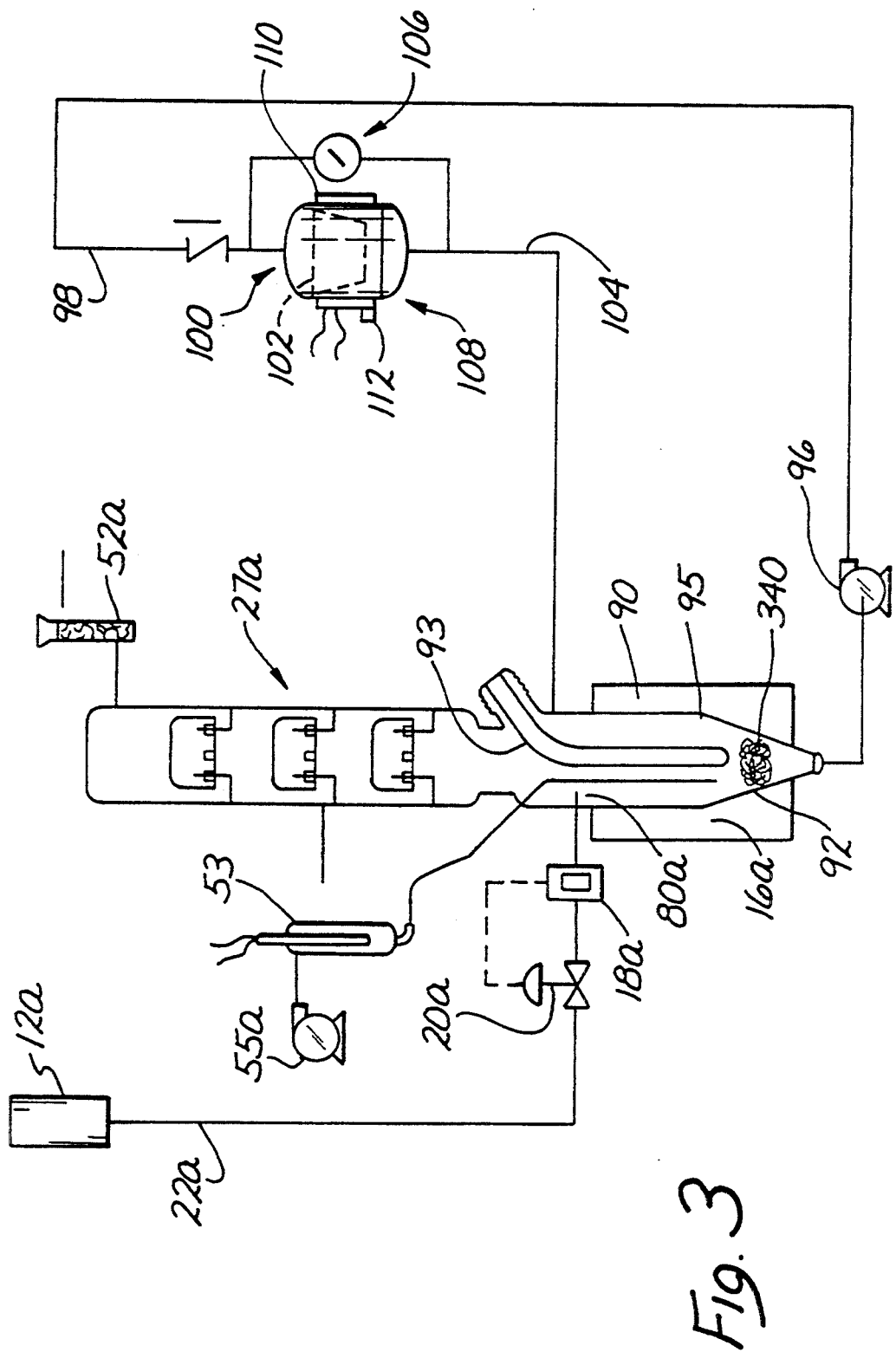
FIG. 3 is a schematic diagram of another embodiment of the invention wherein the heating vessel and condensing tower are aligned and heat is applied by way of a quartz heater or heating mantle.

FIG. 3 illustrates a further embodiment of the invention where structural elements which are similar to those previously described with reference to FIG. 1, are designated by the same reference numeral followed by the letter "a". For example, in FIG. 3 the condenser is designated generally by the reference numeral 27a.

In this embodiment, the boiler 16a is provided with a cylindrical receptacle 90 which is aligned coaxially with the condenser 27a. In this case, however, the lower area of the receptacle 90 is formed by walls 92 which have the shape of a funnel or inverted cone. The effluent or waste 14 is introduced through a nozzle, such as that illustrated schematically at 80a, into the receptacle 90. In this embodiment, the waste 14 can be heated within the receptacle 90 by either a quartz heater 93 or a heating mantle 95.

The quartz heater 93 can be of the type manufactured by Glo-Quartz Electric Heater Co., Pasadena, Calif. and marketed under Model No. 1-750. The heater 93 extends through the walls of the receptacle 90 and directly into the waste 14. A control mechanism (not shown), similar to the temperature control 59 can be provided to shut off the quartz heater 93 at a predetermined temperature.

Alternatively, the boiler 16 can be provided with a heating mantle such as that manufactured by Glass-Col Apparatus Co., Terre Haute, Ind., and sold under the Model No. TM-636-SPECIAL. The heating mantle 95 consists of an electrical resistance heating wire which is embedded in a fiberglass liner and configured to fit the shape of the receptacle 90.

The funnel shape of the walls 92 permits the residue to settle in the bottom of the receptacle 90 and to be removed form this location by a pump 96. The residue slurry is pumped through a line 98 into a filter 100. A basket 102 in the filter 100 removes the larger particles from the residue slurry while permitting any solvent and small particles to be pumped into a line 104 and back into the receptacle 90. A pressure control 106 can be provided to sense a predetermined pressure drop across the line 98 and 104 and to discontinue operation of the pump 96 when the filter basket 102 is generally full.

Figure 4:
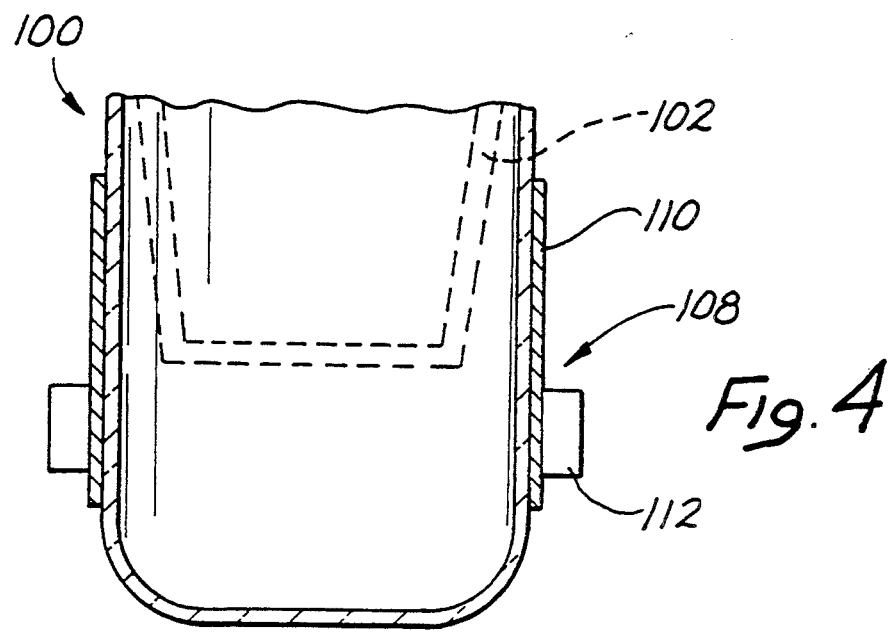
FIG. 4 is an axial cross-section view of the heating vessel in combination with a further embodiment of heater including a coil and copper cladding.

A heater 108 best illustrated in FIG. 4, includes a cladding 110 of heat conducting material such as copper, and an electrical resistance coil 112 which heats the cladding. This heating mechanism is operable to dry the residue in the filter basket 102. In this manner, a dry filter cake tends to form which can then be disposed of with a significantly reduced volume.

Figure 5:
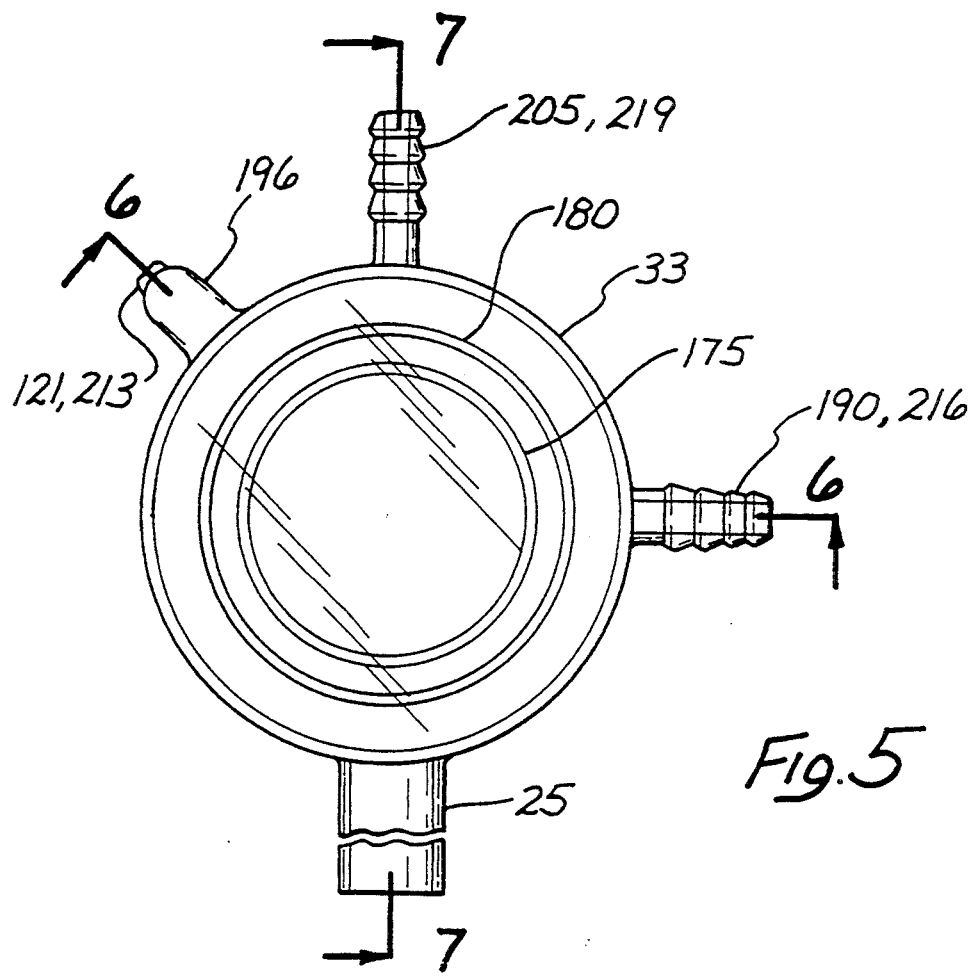
FIG. 5 is a top plan view of a condensing tower specifically adapted for use with aqueous solutions.
Figure 6:
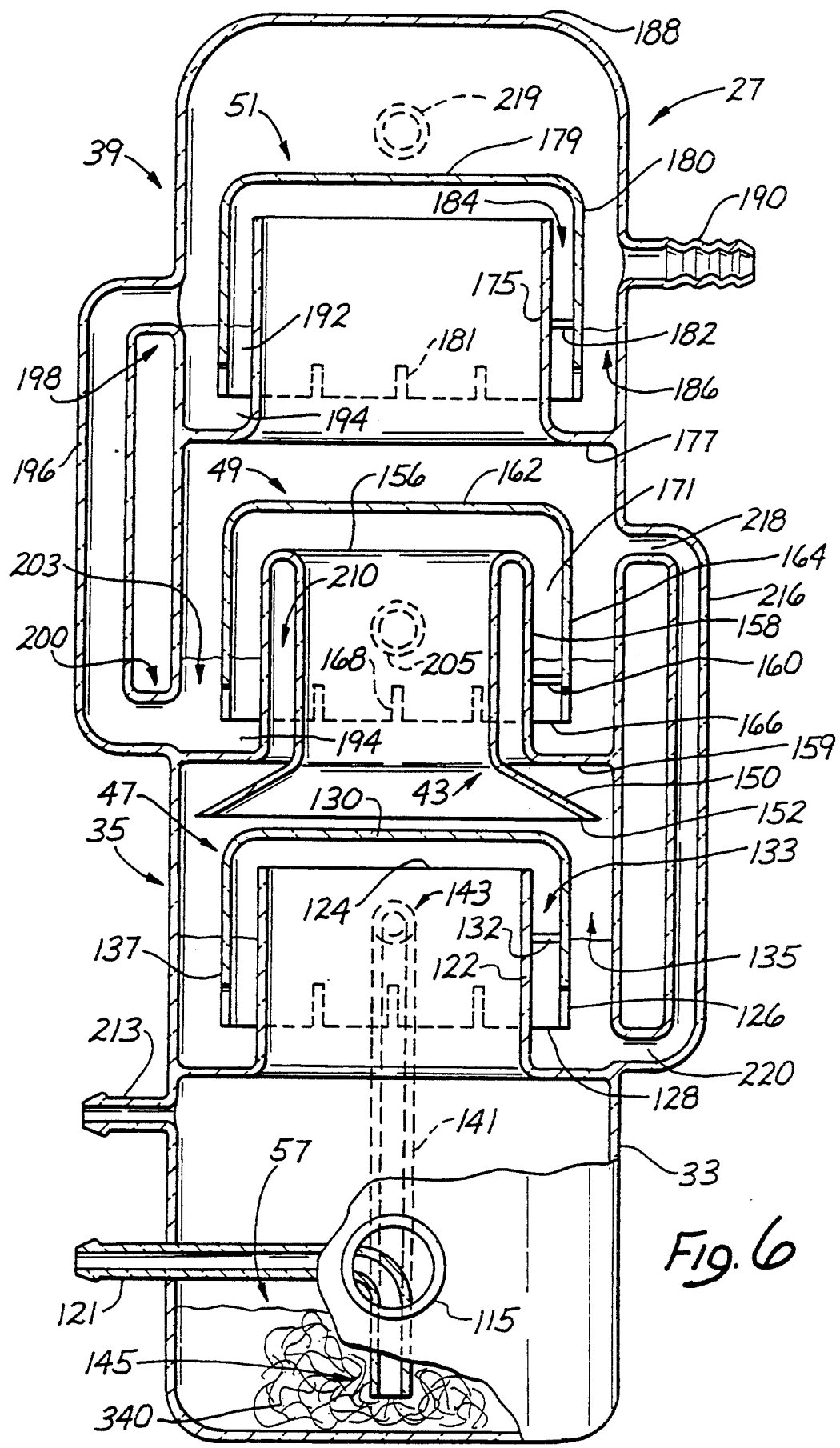
FIG. 6 is an axial cross-section view of the condensing tower taken along lines 6—6 of FIG. 5.
Figure 7:
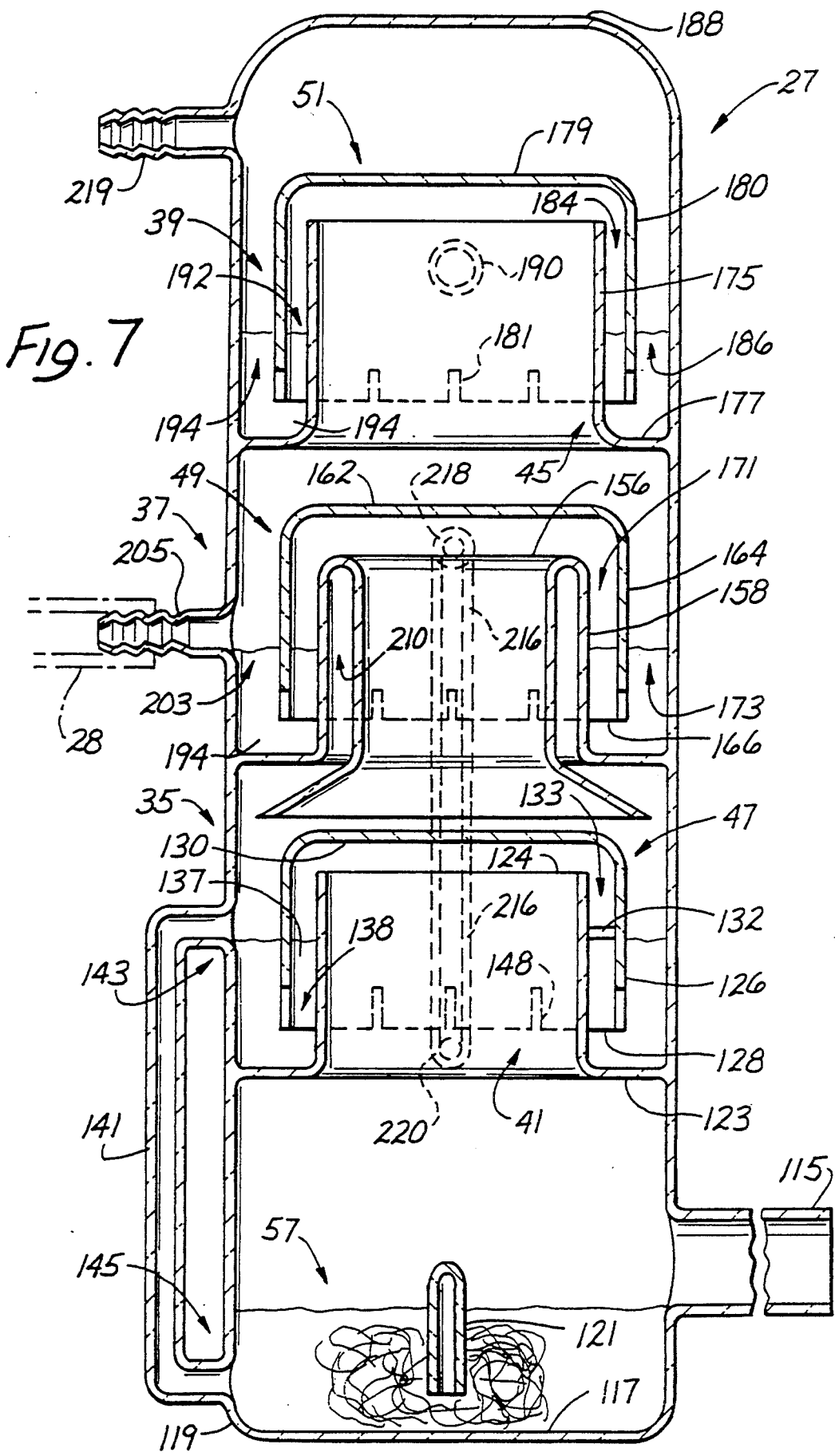
FIG. 7 is an axial cross-section view taken along lines 7—7 of FIG. 5.

A preferred embodiment of the condenser 27 is shown in greater detail in FIGS. 5, 6 and 7. FIG. 5 is a top plan view which best illustrates the orientation of the various nozzles associated with the condenser 27. FIGS. 6 and 7 are axial elevation views taken along the respective cross-sections indicated in FIG. 5.

Referring now to the detail of condenser 27, it will be noted that this embodiment is particularly adapted for use with the FIG. 1 concentrator 10 wherein the boiler 16 includes a microwave oven. Vapors from the boiler 16 pass through the discharge tube 25 into a nozzle 115 which extends through the shell 33 of the condenser 27.

The reservoir 57 has a depth which extends from the lower level of the nozzle 115 to the bottom 117 of the condenser 27. In a manner subsequently described, condensate 119 collects in this reservoir 57 to form a pool in the bottom of the condenser 27.

A nozzle 121 extends through the shell 33 and into the reservoir 57 to a level lower than the surface of the condensate 119. This nozzle 121 provides an inlet for the ozone generated by the blower 55 and UV light source 53. Thus the ozone is bubbled into the condensate 119 and rises with the vapor from nozzle 115 upwardly towards the first stage 35. Alternatively, the ozone may be introduced into the liquid waste 14 in the boiler 16 via a dip tube (not shown). In this embodiment, nozzle 121 is not required.

The first stage 35 of the embodiment illustrated in FIG. 6 and FIG. 7 includes the chimney 41 and the bell cap 47. The chimney 41 has walls 112 which are cylindrical in configuration and have a diameter less than the diameter of the shell 33. In this embodiment the walls 112 extend from an upper lip 124 axially downwardly and then radially outwardly along a flange 123 to contact the shell 33. As the vapor and ozone rise within the condenser 27, they contact the walls 122 of the chimney 41 and are directed by those walls 122 toward the lip 124.

The bubble cap 47 includes walls 126 which are cylindrical in configuration and have a diameter greater than the diameter of the walls 112 but less than the diameter of the shell 33. These walls 126 extend from the lower lip 128, upwardly and then radially inwardly to form a top wall 130 above the lip 124. Thus the bubble cap 47 has the general configuration of an inverted cup which is disposed over the chimney 41. The bubble cap 47 is held in a spaced relationship with the chimney 41 by a plurality of glass rods 132 which extend between the walls 122 and 126. The lip 128 of the bubble cap 47 is spaced from the radial flange 123 so that the walls 126 form a cylindrical passage 133 with the walls 122 and a passage 135 with the shell 33.

As the vapor rises within the chimney 41 it initially contacts the top 130 of the bubble cap 47 and then flows outwardly and downwardly through the cylindrical passage 133. This flow pattern provides a first reversal in the direction of the vapor flow and thereby inhibits the further passage of any large particles or droplets which may be entrained in the vapor. The vapor travels downwardly through the passage 133 to contact the radial flange 123 where it reverses direction and passes upwardly through the cylindrical passage 135.

Although condensation is not promoted in this first stage 35, a condensate 137 may nevertheless form on the walls 122, 126 and the shell 33. This condensate 137 advantageously collects in a recess defined by the shell 33, the radial flange 123 and the walls 122 of the chimney 41. The height of the condensate 137 in this recess 138 is controlled by the height of a downcomer tube 141 which extends from an outlet 143 in the shell 33 to an inlet 145 into the reservoir 57 at the bottom of the condenser 27. The outlet 143 is preferably positioned lower than the lip 124 of the chimney 41 but higher than the lip 128 of the bubble cap 47. As the level of the condensate 137 rises within the recess 138, it reaches the lower level of the outlet 143 and travels down the tube 141 into the reservoir 57.

As the vapor passes upwardly through the chimney 41 and downwardly through the passage 133, it forces condensate 137 down in the passage 133 to a level where the vapor can bubble around the lip 128 and upwardly through the passage 135.

In a preferred embodiment, a plurality of slots 148 are cut vertically in spaced relationship around the perimeter of the lip 128. The spacing of the slots 148 provides for variations in the vapor distribution around the perimeter of the bubble cap 47. The width of the slots can be controlled to provide a particularly advantageous bubble size for the vapor rising in the passage 135. Thus the vapor rises with a preferred bubble size and distribution within the cylindrical passage 135 and upwardly toward the second stage 37 of the condenser 27.

The second stage 37 is of particular interest to the present invention as its purpose is initially to inhibit condensation but ultimately to facilitate condensation of the vapor. Various walls and surfaces are provided in this second stage to direct the vapor along a torturous path, including at least one reversal of direction. A first wall 150 has a conical shape extending from a lip 152 in proximity to the shell 33 upwardly and inwardly to a second wall 154. The wall 154 is generally cylindrical in configuration and has a diameter less than that of the shell 33. The wall 150 funnels the vapor from the channel 133 inwardly of the walls 154 in order to form the chimney 43 of the second stage 37.

At its upper extension, the wall 154 forms a rolled lip 156 which extends outwardly and then downwardly along a cylindrical wall 158. The wall 158 has a diameter greater than the wall 154 but less than the shell 33. Thus the wall 154 is bent back upon itself at the lip 156 to form the wall 158. This wall 158 extends downwardly to a radial flange 159 which is connected to the shell 33 and supports the entire structure consisting of the walls 150, 154 and 158.

The bubble cap 49 is configured similar to the cap 47 with a top 162 and cylindrical wall 164 which extends downwardly to a lip 166. The cap 49 is held in a fixed relationship with the chimney 43 by a plurality of rods 160 which extend generally radially between the walls 158 and 164. In this position the top 162 is spaced above the lip 156 and the lip 166 is spaced above the flange 159. Slots 168 can also be provided in the bubble cap 49.

The bubble cap 49 is located in an inverted position with the walls 164 extending downwardly between the walls 158 and the shell 33. Thus a cylindrical passage 171 extends around the lip 156 and downwardly between the walls 158 and 164. A second passage 173 extends from the passage 171 at the lip 166 and upwardly between the walls 164 and the shell 33.

The third stage 39 can be positioned above the second stage 37 and provided with a configuration which is similar to stage 35. Thus the chimney 45 can be constructed similar to the chimney 41 with cylindrical walls 175 similar to the walls 122 and a radial flange 177 similar to the flange 123. In like manner, the bubble cap 51 can be provided with a top 179 similar to the top 130 and a downwardly extending cylindrical wall 180 similar to the walls 126. A plurality of rods 182 can be provided to hold the bubble cap 51 in space relationship with the wall 180 between the wall 175 and the shell 33. Thus the walls 175, 180 and the shell 33 define a first passage 184 similar to the passage 133 and a second passage 186 similar to the passage 135. Slots 181 can also be provided around the bubble cap 51. The shell 33 is closed to form a top 188 of the condenser 27 above the third stage 39.

In this particular embodiment, water is input to the third stage 39 of the condenser 27 and provides a coolant 194 the purpose of which is to facilitate condensation of the vapor. Water is preferred as the coolant 194 particularly with respect to any waste 14 which includes an aqueous solvent. In such a case the condensing vapor can be scrubbed onto and mixed with the coolant 194 for direct discharge to the drain 31.

In a preferred embodiment, the coolant 194 is input to the third stage 39 through a nozzle 190 which extends though the shell 33. This nozzle 190 is preferably positioned above the radial flange 177 so that the coolant 194 will collect in a cylindrical recess 192 which is defined by the walls 175, the flange 177, and the shell 33. The coolant 194 collects in this recess 192 to a level which is dictated by the position of a downcomer tube 196 which extends from an outlet 198 at the third stage 39 to an inlet 200 at the second stage 37. The outlet 198 is preferably positioned above the slots 181 so that any vapor passing though the slots 181 will be scrubbed against and forced to bubble through the coolant 194.

As the coolant 194 fills the recess 192, it will begin to pass down the downcomer tube 196 to fill a similar recess 203 defined by the wall 158, the flange 159, and the shell 33. The level of coolant 194 in the recess 203 is dictated by the location of the nozzle 205 which extends through the shell 33 to exit the condenser 27. The nozzle 205 is connected to the line 28 which carries the coolant 194 and any condensate from the stages 37 and 39 to the drain 31. The nozzle 205 is preferably located above the slots 168 so that the vapor traveling down the passage 171 is forced to scrub onto and bubble through the coolant 194.

In the illustrated embodiment the coolant 194 directly contacts and condenses the vapor. However, it is also the purpose of the coolant 194 to chill the walls that it contacts thereby facilitating condensation of the vapor on these walls. In FIG. 5, the contacted walls include the walls 175 and 180 in the third stage 39 as well as the walls 158 and 164 in the second stage 37. Specifically and intentionally uncontacted are the walls 150 and 154 which are associated with the chimney 43 in the second stage 37. In fact, these walls 154 and 150 are insulated from the coolant 194 by a dead space 210 which is defined by walls 150, 154, 158 and flange 159 and the shell 33. As the vapor travels upwardly from the first stage, some of it passes into the dead space 210 while a majority of it passes up the funneled walls 150 into the chimney 43. With the walls 154 surrounded on both sides by the vapor, condensation on the walls 154 is generally inhibited. This is desirable as any condensation inside the chimney 43 would travel downwardly into the recess 183 and ultimately through the tube 141 into the reservoir 57. Any such condensate is substantially unprocessed and therefore tends to reduce the efficiency of the condenser 27. This is also the case with any condensation occurring in the chimney 41, the passage 133 or the passage 135 where condensation is also inhibited. Only after the vapor has reversed direction around the rolled lip 156 in the second stage 37 is it permitted to contact the walls 158 and 164 which have been chilled by the coolant 194.

Two additional aspects of the condenser 27 are associated with the need to equalize pressures within the various stages. A nozzle 213 extends though the shell 33 and is attached via flexible tubing to the vapor space at the top of level switch 18. Without nozzle 213 and the connecting balance line, the reading of the feed level switch 18 would be inaccurate.

In a preferred embodiment, a tube 216 extends though the shell 33 between the first stage 35 and the second stage 37. In this embodiment the tube 216 is provided with an inlet 218 above the level of the coolant 194 in the passage 173, and an outlet 220 beneath the level of the slurry 137 in the passage 135.

This tube 216 provides for the equalization of pressures between these two passages 173 and 135. Thus it functions as a balance line to let pressures equalize particularly during shutdown when the first stage 35 tends to cool thereby creating a vacuum in that region.

In operation, the vapor from the boiler 16 enters the condenser 27 at the nozzle 115 and mixes with ozone from the nozzle 121. The gases then travel upwardly through the chimney 41 through a first reversal in direction at the lip 124 downwardly through a second reversal in direction at the lip 128, and again upwardly through the passage 135. These gasses then continue through the funneled walls 150 into the chimney 43 of the second stage 37. Any condensate developed up to this point flows downwardly into the recess 138 and through the tube 141 back into the reservoir 57. Such condensation is inhibited by isolating and insulating all contacting surfaces to this point from the coolant 194.

As the vapors pass through the third reversal in direction at the lip 156 and a fourth reversal in direction at the lip 166, they are scrubbed against and bubbled through the coolant 194 in the recess 203. Any remaining vapors pass upwardly into the chimney 45 of the third stage 39. Passing though a fifth and sixth reversal in direction these vapors scrub against and bubble through the coolant 194 in the recess 192. Thus the condensate mixes with the coolant 194 and passes down the tube 196 for ultimate discharge through the nozzle 205 into the drain 31. Any vapors remaining above the third stage 39 can be vented to atmosphere through a nozzle 219 and the charcoal filter 52 (FIG. 1).

In a preferred method associated with the invention, the waste material 14 after heat exchange with the waste water in seal pot 29, is introduced into the boiler 16 where the material tends to be separated into a rising vapor and a slurry or residue which remains in the boiler 16. The vapors are directed into the condenser 27 where they have a tendency to condense in both the first stage 35 and the second stage 37. Walls 122, 126, 154, 158 and 164 are provided in these stages to direct the vapors along a torturous path which include several reversals in direction.

A coolant is introduced to the second stage 37 to cool the walls 158 and 164 and thereby facilitate condensation of the vapors. This coolant 194 is isolated from the walls 154, 126 and 122 to inhibit condensation of the vapors in the first stage and the chimney 43. Thus condensation of the vapors in the first stage 35 is inhibited while condensation of the vapors in the second stage 37 is facilitated. Any condensate forming in the first stage 35 is directed back to the reservoir 57 or the heating chamber of the boiler 16. Any condensate forming in the passages 171 and 173 of the second stage 37 is drained from the condenser 27 through the nozzle 205.

Referring now to FIG. 8, a further embodiment of the invention provides for preheating of the waste 14 and recirculating the coolant 194. In this embodiment, structures which are similar to those previously discussed will be referred to using the same reference numerals followed by the lower case letter "b".

As in the previous embodiments, this apparatus begins with a photo processor 12b or other apparatus providing the effluent or waste 14. This waste is introduced through a feed line 22b to a preheater or heat exchanger 230 discussed in greater detail below. From the heat exchanger 230, the waste 14 is fed through a solenoid valve 20b and into a boiler apparatus 232. This apparatus 232 includes a boiler 234 and a first stage condenser sometimes referred to as a precondenser 236.

In the boiler 234, the waste 14 is heated to form the solvent vapor which rises from the boiler 234 upwardly into the precondenser 236. This precondenser 236 is similar to the first stage 35 of the FIG. 1 and FIG. 3 embodiments, in that it is designed mainly to entrap any large particles which may be carried by the solvent vapor. Although some condensation of the vapor occurs in the precondenser 236 any resulting condensate is returned through the downcomer tube 141b into the reservoir 57b associated with the boiler 234.

Having removed any large particles from the vapor, the boiler apparatus 232 directs the solvent vapors to exit the precondenser 236 through a nozzle 238 and to enter a condensing tower 241 through tube 243. Since the boiler apparatus 232 in this embodiment is formed separately from the condensing tower 241, it is particularly desirable to join the output nozzle 238 and input tube 243 with a flexible conduit or tube 245. In order that this tube 245 can withstand vapor temperatures as high as 400° F., this tube 245 is formed from Teflon ® in a preferred embodiment. Thus the flexible tube 245 functions to permit relatively loose alignment between the precondenser 236 and the condensing tower 241.

The condensing tower 241 is similar to that previously discussed in that it contains three condensing stages 247, 249 and 252. In this embodiment however the bottom stage 247 is the second stage, the middle stage 249 is the third stage, and the upper stage 252 is the fourth condensing stage.

The fourth stage 252 is similar to the stage 39 of the FIG. 1 embodiment in that it receives the coolant 194 through the nozzle 190b and vents any uncondensed vapors through the outlet nozzle 219b. The downcomer tube 196b conducts the coolant into the third stage 249 which is similar to the stage 37 in the FIG. 1 embodiment. In this case however, the third stage 249 does not include any structure similar to the funnel shaped chimney 43 illustrated in FIG. 6.

The bottom stage 247 of the condensing tower 241 is quite different from the stage 35 discussed in previous embodiments, in that the vapor inlet nozzle 243 directs the solvent vapors downwardly into the top of a bell cap 254 which is inverted over a pedestal 256 which forms the bottom of the tower 241. A downcomer tube 258 is provided to conduct the coolant from the middle stage 249 to the bottom stage 247 of the tower 241. Thus each of the second, third, and fourth stages 247, 249, 252, respectively, are charged with the coolant 194 to enhance the condensing capabilities of the tower 241. Only the precondenser or first stage 236 performs any condensing function without the aid of the coolant 194.

If the waste 14 is an aqueous mixture so that the condensing solvent vapor forms water, the coolant 194 is preferably water and the vapor is scrubbed directly into the coolant. As previously discussed, this enhances condensation of the vapor since there is direct contact between the coolant 194 and the vapor; it also avoids the necessity of separating the coolant 194 from the vapor condensate. If the vapor is scrubbed directly into the coolant 194, the condensate actually increases the volume of the coolant 194 as it passes through the outlet nozzle 205b into the heat exchanger 230.

When the coolant 194 is introduced into the tower 241 at the inlet nozzle 190b, its temperature may be 90° F. As it absorbs heat from the condensing solvent vapor within the tower 241, the temperature of the coolant 194 increases to about 140° F. In this embodiment, this is the temperature of the coolant 194 as it leaves the tower 241 and enters the heat exchanger 230.

The waste 14 from the feed line 22b enters the heat exchanger 230 at a temperature such as ambient room temperature. Heat is transferred from the coolant 194 to the waste 14 in the heat exchanger 230 so that the temperature of the waste 14 as it enters the boiler 234 is approximately 120° F. Thus the heat exchanger 230 functions to lower the temperature of the coolant 194 while preheating the waste 14. This advantageous transfer of heat greatly increases the efficiency of this embodiment.

From the heat exchanger 230, the coolant 194 can be dumped totally into a drain 31b through a drain line 258. In an alternate embodiment which provides for recirculation of the coolant 194, the drain line 258 dumps only the excess coolant into the drain 31b. The main portion of the coolant 194 is recirculated by a pump 261 through an air cooler 263 and a carbon filter 265 for reintroduction through the inlet nozzle 190b into the tower 241.

The temperature of the coolant 194 as it exits the heat exchanger 230 may be approximately 130° F. This temperature may be increased slightly as it passes through the pump 261 and enters the air cooler 263. In an embodiment which circulates approximately 1/16 gallon per minute of the coolant 194, the air cooler reduces the temperature of the coolant 194 to approximately 90° F. for reintroduction into the condensing tower 241.

The embodiment of FIG. 8 has several other features which are of particular advantage to this invention. One of these features is associated with a system which is responsive to the pressure of the solvent vapor above the boiler 234 for maintaining an optimum level of the waste 14 in the boiler 234. This optimum level may be the particular level illustrated in FIG. 8 and designated by the reference numeral 272. This level maintenance system is of particular advantage since it relies upon existing systems and hardware for its input of information. One of these systems is the ozone injection system which includes a blower 55b and UV lamp 53b as previously discussed. The ozone developed from this combination is injected into a tube 274 which extends through a hermetically sealed lid 266 through the precondenser 236 and into the waste 14 in the boiler 234.

Since the tube 274 extends into the waste 14, the pressure which must be exerted on the ozone in order to force it through the tube 274 is dependent upon the pressure of the solvent vapor on the surface of the waste 14 and the head pressure of the waste 14. This head pressure is a function of the distance between the surface of the waste 14, designated by the particular level 272, and the bottom of the tube 274.

In order to maintain the waste 14 at the particular level 272, a differential pressure sensor 278 is provided to control the opening and closing of the solenoid valve 20b. This pressure sensor 278 is responsive to not only the pressure of the solvent vapor above the particular level 272 but also to the pressure of the ozone in the tube 274. In the illustrated embodiment, the solvent vapor pressure is monitored through a conductor 281 while the ozone pressure is monitored through a conductor 283.

The pressure sensor 278 generates an electrical signal when the difference between the pressures on the conductors 281 and 283 falls below a particular magnitude. It is this electrical signal which activates the solenoid 20b to introduce additional waste 14 into the boiler 234. If the surface of the waste 14 drops below the particular level 272, the head pressure of the waste 14 decreases along with the pressure of the ozone in the tube 274. Since the solvent vapor pressure remains constant, the differential pressure monitored by the sensor 278 drops and the valve 20b is activated.

Conversely, if the level of the waste 14 in the boiler 234 rises above the particular level 272, the head pressure rises as does the differential pressure measured by the sensor 278. The electrical signal provided by the pressure sensor 278 is then discontinued or otherwise changed and the solenoid valve 20b closes to inhibit the further introduction of waste 14 into the boiler 234.

Another feature of this embodiment is associated with the configuration of the boiler 234, which is shown in greater detail in FIG. 9. As in previous embodiments, the boiler 234 includes a receptacle 61b which is formed from glass and provided with generally cylindrical walls 62b. These walls 62b are surrounded by a sleeve 287 which is preferably formed from a material having a high heat conductivity, such as copper. The receptacle 61b and associated sleeve 287 are disposed in a heating mantle 95b which includes a plurality of heating coils 289 disposed to closely surround the sheath 287.

In this embodiment, the sheath 287 functions to evenly distribute the heat emanating from the heating coils 289 along the walls 62b of the receptacle 61b. This avoids any hot spots which might otherwise occur in proximity to the heating coils 289.

Due to its high heat conductivity, the sleeve 287 also functions as means for averaging the temperature of the heating mantle 95b so that this temperature can be measured at a single point of contact for example by a single thermocouple 292. A temperature control 294 can then be provided for maintaining the heat provided by the mantle 95b in response to the temperature sensed by the thermocouple 292. In a preferred embodiment, the temperature of the mantle 95b is maintained at approximately 400° F.

The boiler apparatus 232, including the boiler 234 (absent the heating mantle 95b) and the precondenser 236, is illustrated in greater detail in FIG. 9. The walls 62b of the receptacle 61b extend upwardly to a lip 301 which forms the top of the boiler 234. In a preferred embodiment, the lip 301 has a circular configuration and a diameter of about five inches. As in the previous embodiment, a flexible bag or liner 67b is provided to receive the waste 14. In this embodiment, however, a large stopper 303 is provided to form a seal between the walls of the bag 67b and the walls of the receptacle 61b. The stopper 303 is formed with a cylindrical wall 305 which has an outer diameter slightly less than that of the lip 301 and an outer surface which ramps downwardly and inwardly toward a recess 307 at the bottom of the stopper 303.

In this embodiment, the walls of the bag 67b can be positioned around the stopper 303 and sealed against the outer surface of the wall 305 by a retention spring 309 which seats in the recess 307. In the upper regions of the stopper 303, recesses are provided to accommodate O-rings 312 which form seals between the stopper 303 and the walls 62b of the receptacle 61b.

The stopper 303 includes an integral handle 314 which includes an outwardly projecting cylindrical flange 316. This handle 314 is typically disposed above the lip 301 of the receptacle 61b and has a reduced diameter permitting the user to engage the flange 316 and to remove the stopper 303 together with the attached bag 67b through the top of the precondenser 236. The walls 305 of the stopper 303 defines a large axial bore 313 which provides communication between the waste 14 in the bag 67b and the precondenser 236.

In a preferred embodiment, the stopper 303 is formed of nylon, the spring 309 is formed of stainless steel, and the O-rings 312 are formed from a material which is commonly sold by DuPont under the trademark Viton ®. Other materials may be suitable if they can withstand the temperature such as 400° F. which is associated with the heating of the waste 14, as well as ozone and other chemicals present in the system.

In the illustrated embodiment, the precondenser 236 is integral with the receptacle 61b of the boiler 234. It includes an outer cylindrical wall 318, a subwall 122b extending inwardly and upwardly to form a chimney 41b, and an inner wall 321 forming a bell cap 323 which extends downwardly between the outer wall 318 and the subwall 122b. A plurality of slots 148b are cut in the lower edge of the bell cap 323.

The solvent vapor rises from the boiler 234 upwardly through the axial bore 313 of the stopper 303 and continues upwardly through the chimney 41b. Above the chimney 41b, the pressure of the vapor is sensed through the conductor 281 which is attached to a nozzle 325. The flow of the vapor travels downwardly between the subwall 122b and the wall of the bell cap 323, through the slots 148b, and then reverses direction to travel upwardly between the walls of the bell cap 323 and the outer wall 318. From this location the vapor passes outwardly through the nozzle 238 and into the condensing tower 241.

Since some condensation of the vapor will undoubtedly occur on the cool walls of the precondenser 236, condensation will collect in a recess 327 defined between the subwall 122b and the outer wall 318. The level of the condensate in the recess 327 is determined by the point of upper attachment of a downcomer tube 330. Passing through this tube 330, the condensate will collect in a second recess 332 between the outer wall 318 and the wall 62b of the receptacle 61b. In this recess 332, the condensate will collect to the level of a plurality of side holes 334 which extend through the walls 305 of the stopper 303. In the illustrated embodiment, these holes are defined at approximately the level of the lip 301 of receptacle 61b.

In operation, the waste 14 is fed into the boiler 234 through a nozzle 336. The waste 14 passes through the side holes 334 with any excess condensate from the precondenser 236. It then travels downwardly through the axial bore 313 of the stopper 303 into the reservoir defined by the bag 67b. In this location, the waste 14 is heated and the solvent associated with the waste is vaporized as previously discussed.

It is of particular advantage that the area between the bag 67b and the wall 62b is vented through a tube 338 which connects this area with the regions defined by the inner wall 321 of the precondenser 236. As the waste 14 enters the bag 67b, the tube 338 permits entrapped air to pass from between the bag 67b and the wall 62b. This enables the bag 67b to move into close proximity with the wall 62b which facilitates heating the waste 14.

As previously mentioned, ozone is introduced to the waste 14 in the boiler 16 in order to mix with the condensate 119 and vapor, and thereby promote the decomposition of objectionable compounds. In photochemical applications, these compounds may include high molecular weight alcohols such as octyl alcohol. These alcohols are not particularly soluble in water and tend to have objectionable odors. They also are somewhat oily so that the entire apparatus of the concentrator 10 can ultimately become covered with this oily substance. It has been found that the ozone promotes decomposition of these compounds thereby providing for a cleaner apparatus and reducing the possibility of objectionable odors.

It has also been found that the ozone tends to inhibit any foam which may emanate from the boiler 16. This is particularly a problem with respect to photochemicals which tend to foam when they are boiled. The ozone reduces this foaming tendency.

In an embodiment where the waste 14 includes a metal-containing component, e.g., one or more metal compounds, complexes, salts and the like (whether or not ionized), such as silver nitrate, it may be desirable to reduce the toxicity of the mixture or at least the residue of the mixture. For one reason, a lower toxicity may be accompanied by a reduction in the safety requirements associated with the transportation and disposal of the waste. By way of example, government regulations often require sophisticated procedures for the transportation and disposal of heavy metal compounds having a solubility in water greater than some minimum level.

It has been found with respect to the present invention that the metal-containing component in the waste mixture 14 can be contacted with an active component in order to convert, preferably oxidize, the metal-containing component in the waste 14 to another metal-containing component having decreased solubility in water. More preferably, this component includes active oxygen, such as ozone.

Although not fully understood, it is believed that the effluent from the photoprocessor 12 includes silver nitrate which has a relatively high solubility in water, e.g., at an ambient temperature of 22° C., a solubility such as about five milligrams per liter. Without wishing to limit the invention to any particular theory of operation it is believed that by contacting this waste with ozone, the silver nitrate is converted to form at least one other silver-containing component which has a significantly reduced solubility in water relative to silver nitrate preferably of less than about 0.5 milligrams per liter at such ambient temperature.

The metal in the metal-containing component may be oxidized to a higher oxidation state. It may also be that the metal-containing component, such as silver nitrate, reacts with the active oxygen or ozone to form a second compound, a metal oxide such as silver oxide, which has reduced solubility in water. It is also believed that the conversion of the metal-containing component is enhanced by contacting it with the active component while the mixture is being heated. In fact, oxidation of this metal-containing component occurs very favorably when the ozone is bubbled into a boiling waste mixture.

It will be apparent that this invention applies equally to other effluents and wastes 14 which include other heavy metal-containing components having a relatively high degree of water solubility. It is believed that this water solubility can be decreased by contacting the effluent or waste including the metal-containing components with any component which effectively converts, preferably oxidizes, the metal-containing component to another metal-containing component having reduced water solubility. While the preferred embodiment relies upon an active component including active oxygen, in particular ozone, it is believed that other active components whether in gas, liquid or solid state, may also convert, preferably oxidize, the metal-containing component to a component having decreased water solubility.

In the interest in further reducing the concentration of the metal containing component in its insoluble form, it may be desirable to add to the waste 14 in the reservoir 57 a second metal. Depending on the characteristics of the metal containing component in the waste 14, this second metal may include iron in a particular form which facilitates a change in the metal containing component to a state of further insolubility.

For example, in the case of a photo processing effluent containing silver nitrate, iron can be added to the waste 14 in the boiler 16 in the form of a steel wool 340. In a particular process, 5 milligrams of steel wool 340 may be sufficient to create the desired effect. In the resulting reaction, the iron tends to form iron nitrate leaving the silver in an elemental state which is not soluble. Alternatively the iron may catalyze or otherwise drive the silver nitrate to a higher oxidation state which is less soluble.

This solubility can be measured in accordance with a standard analytical procedure commonly referred to as TCLP. Waste material which contains more than 0.5 milligrams per liter of leachable silver, as determined by the TCLP test, is generally considered to be hazardous. While the use of ozone by itself may reduce the concentration of leachable silver by as much as 98%, it has been found that the addition of the steel wool 340 can further reduce the concentration of leachable silver to 0.1 milligrams per liter.

Thus, both the ozone and the steel wool tend to promote the conversion of silver from a soluble, hazardous state, to an insoluble, non-hazardous form. As a consequence, the residues from the apparatus of the present invention can be classed as non-hazardous and can be shipped without any special procedures or labeling.

Although this invention has been described with reference to specific embodiments of the concept, it will be appreciated by those skilled in the art that the invention can be otherwise embodied. For this reason, the scope of the invention should be ascertained only with reference to the following claims.

What is claimed is:

1. A concentrator for reducing the volume of a mixture including a solvent, comprising:
    means forming a chamber to receive the mixture;
    means coupled to the chamber for applying heat to the mixture within the chamber, the heat being provided at a temperature sufficient to form a vapor having a first temperature;
    a condenser coupled to receive the vapor from the chamber, the condenser including a first stage and a second stage;
    directing means included in each of the first stage and the second stage of the condenser for receiving the vapor and for directing vapor along a torturous path including at least one reversal of direction;
    means for cooling the second stage of the condenser but not the first stage in order to facilitate condensation of the vapor in the second stage but not in the first stage of the condenser;
    means included in the cooling means for introducing a condensing liquid into the second stage of the condenser at a second temperature less than the first temperature of the vapor, the condensing liquid drawing heat from the vapor to condense the vapor and to increase the temperature of the condensing liquid to a third temperature greater than the second temperature; and
    heat exchange means receiving the mixture and receiving the condensing liquid at the third temperature, for preheating the mixture and for precooling the condensing liquid from the third temperature to the second temperature.

2. The concentrator recited in claim 1 wherein the vapor tend to form a condensate in both the first stage and the second stage, the concentrator further comprising:
    means included in the directing means for inhibiting the return of the condensate from the second stage to either the first stage or the chamber while facilitating the return of the condensate from the first stage to the chamber.

3. The concentrator recited in claim 2 wherein the directing means further comprises:
    a first wall including in the first stage and facilitating formation of a first condensate, the first wall being in fluid communication with the chamber to facilitate return to the chamber of the first condensate formed on the first wall; and
    a second wall included in the second stage and facilitating formation of a second condensate, the second wall being isolated from the chamber to inhibit the return to the chamber of the second condensate formed on the second wall.

4. The concentrator recited in claim 3 wherein the cooling means is directed onto the second wall in order to facilitate formation of the second condensate of the vapor on the second wall.

5. The concentrator recited in claim 4 further comprising insulation means disposed between the first wall in the first stage and the second wall in the second stage for insulating the cooler second wall from the warmer first wall.

6. The concentrator recited in claim 1 wherein continuous evaporation of the mixture tends to create a residue, and the concentrator further comprising:
    means for receiving the residue from the chamber and for drying the residue in order to facilitate disposal of the residue.

7. The concentrator recited in claim 6 wherein the drying means includes a microwave oven.

8. The concentrator recited in claim 1 wherein the heat applying means includes a microwave oven disposed to receive the chamber forming means and operable to apply microwave energy to the mixture within the chamber.

9. The concentrator recited in claim 1 wherein the heat applying means includes a quartz heater mounted to extend into the chamber and adapted to apply heat directly to the mixture within the chamber.

10. The concentrator recited in claim 1 wherein the condenser is formed from glass.

11. The concentrator recited in claim 1 wherein the solvent is water.

12. The concentrator recited in claim 1 wherein the cooling means further comprises:
    means for removing the condensing liquid together with the condensed vapor of the second stage from the condenser.

13. The concentrator recited in claim 12 wherein the condenser includes a third stage connected to the second stage for receiving uncondensed from the second stage.

14. The concentrator recited in claim 13 wherein the introducing means includes means for introducing the condensing liquid into the third stage and from the third stage into the second stage, and the removing means includes means for removing the condensing liquid and the condensing vapor of the second stage and the third stage from the condenser.

15. A concentrator for reducing the volume of a mixture including a solvent, comprising:
    a container for receiving the mixture;
    means for heating the mixture in the container to vaporize at least a portion of the solvent and create a solvent vapor having a predetermined temperature;
    a condenser coupled to receive the solvent vapors from the container, the condenser including a first stage and a second stage;

means for introducing a condensing liquid into the second stage of the condenser but not the first stage of the condenser, the condensing liquid having a first temperature less than the predetermined temperature of the solvent vapor, the condensing liquid drawing heat from the solvent vapor to condense the solvent vapor and increase the temperature of the condensing liquid to a second temperature greater than the first temperature;

recirculating means for receiving the condensing liquid from the condensing means at the second temperature and for returning the condensing liquid to the condensing means at the first temperature; and heat exchange means included in the recirculating means for receiving the mixture and the condensing liquid at the second temperature, and for preheating the mixture and introducing the preheated mixture to the container.

16. The concentrator recited in claim 15 wherein the heating means includes:

a heating mantle configured to receive at least a portion of the container;

heating coils disposed in the mantle and in surrounding relationship to the container; and a sleeve of heat-conductive material disposed between the heating coils and the container for increasing the uniform distribution of heat from the coils to the container.

17. The concentrator recited in claim 15 wherein both the solvent and the condensing liquid include water.

18. The concentrator recited in claim 17 wherein the condenser includes means for introducing the condensing liquid to the solvent vapor and for condensing the vapor into the condensing liquid.

19. The concentrator recited in claim 18 further including a recirculating means which includes means for discarding a portion of the condensing liquid into a drain.

20. A concentrator for reducing the volume of the mixture including a solvent and dissolved and undissolved solids, including:

a container defined by rigid walls and being sized and configured to receive the mixture;

a flexible bag disposed in sealing relationship with the container and forming a first cavity in the bag and a second cavity between the bag and the walls of the container;

means for introducing the mixture into the first cavity thereby increasing the volume of the first cavity while decreasing the volume of the second cavity;

means for venting the second cavity to facilitate a contacting relationship between the bag and the walls of the container;

means for heating the mixture in the bag to vaporize at least a portion of the solvent and form a solvent vapor;

a first condensing stage receiving the solvent vapor from the first cavity and for condensing at least a portion of the solvent vapor;

a second condensing stage receiving the solvent vapor from the first condensing stage and for condensing an additional portion of the solvent vapor; and means for introducing a condensing fluid into the second condensing stage but not the first condensing stage to facilitate condensation of the solvent vapor in the second condensing stage.

21. The concentrator recited in claim 20 wherein the first condensing stage is integral with the container, and the concentrator further comprises flexible alignment means for coupling the first condensing stage to the second condensing stage.

22. The concentrator recited in claim 20 wherein each of the first stage and the second stage includes a bell cap for directing the solvent vapor along a torturous path including at least one reversal of direction in each of the first stage and the second stage.

* * * * *